Oct. 3, 1967    W. P. KLIEWER    3,344,897
ACTUATION DEVICE FOR ACTUATING ARTICLE DISPENSERS
Filed Dec. 6, 1965    6 Sheets-Sheet 1

WESLEY P. KLIEWER
INVENTOR

Huebner & Worrel
ATTORNEYS

WESLEY P. KLIEWER
INVENTOR

WESLEY P. KLIEWER
INVENTOR

Huebner & Worrel
ATTORNEYS

3,344,897
ACTUATION DEVICE FOR ACTUATING ARTICLE DISPENSERS
Wesley P. Kliewer, 2610 Talisman Drive, Bakersfield, Calif. 93304
Filed Dec. 6, 1965, Ser. No. 512,283
11 Claims. (Cl. 194—4)

ABSTRACT OF THE DISCLOSURE

An article dispenser actuating device including an elongated key member adapted to actuate an article dispenser proportionate to the length of the key inserted in the dispenser and mechanism for deforming a portion of the key in proportion to the value of an article dispensed, to thereby prevent subsequent actuation of the dispenser by the deformed portion of the key.

---

The present invention relates to an actuation device for actuating article dispensers and more particularly to such a device for actuating article dispensers to dispense articles, having characteristic respective values, in response to the receipt of a corresponding longitudinal portion of an elongated key proportionate to the value of an article to be dispensed and for deforming a portion of said key in proportion to the value of an article dispensed so as to prevent subsequent actuation of the device by the deformed portion of the key.

Background

In the vending or dispensing machine industry, various devices have been developed for controlling the operation of vending machines by means of coins representing the value of articles selectively dispensed. Such devices are useful in vending machines situated in a variety of locations frequented by buyers of many kinds of articles, such as soft drinks, food, candy, toilet accessories and the like. Such machines are potentially adaptable to the vending of many other types of articles not heretofore vended mechanically due primarily to the limitations inherent in the use of minted coins for selective control of the vending operation and an inability to accommodate wide ranges of prices of articles vended and to make proper change.

Although prior to the present invention, coins had proven quite satisfactory as a medium of exchange or form of control for vending machines, there are several rather significant limitations to the use of coins which prevent vendors from taking advantage of various marketing techniques to improve the efficiency and economy of their operation as well as to increase sales. In the use of coins for controlling vending machines, there is always the problem of providing a sufficient supply of change to allow buyers to use coins having the precise evaluation necessary to purchase desired items. Lack of change frequently shuts down an entire operation, especially during periods of coin shortages. Further, the problem of coin supply can also be a deterrent to vending higher priced articles, since greater supply of higher denomination coins would be required than might normally be on hand. The mechanical vending of higher priced articles is further complicated by the need for more refined coin-operable mechanisms adapted to accept a plurality of coins of various denominations before dispensing a desired item. The use of coins also frequently presents a problem of price setting when the price of an article falls between two five-cent denominations and the vendor is faced with the decision of which denomination to choose. For low-price articles, under-pricing might result in a loss to the vendor, while over-pricing would deter a buyer from making the purchase. The use of pennies to alleviate this problem requires excessively complicated mechanisms and vending procedures. Another aspect of this problem is the fact that prices frequently fluctuate, although often only slightly, and the vendor is not able to adjust the prices quoted for the articles or conveniently to change the vending prices on the machine.

There are further disadvantages in the use of coins for vending machines which hinder effective sales management. A vendor has no way of projecting probable sales volume so as to allow preparation to meet the demand, since any purchaser with a supply of coins may make use of the vending machines. Since potential purchasers include the entire purchasing public, there is little indication of the segment of the public which will be using the machines over a particular period. The vendor has no way of recognizing the various customers who purchase his articles and as a result he is precluded from making use of personal contacts or incentives to promote further sales. For example, it is frequently desirable to provide customers with premium purchasing power proportionate to the volume of their purchases, thereby awarding them an advantage over relatively infrequent purchasers. With coin operated vending machines, such preferential treatment is virtually impossible.

Summary

The present invention provides an actuation device to actuate article dispensers, and more particularly to such a device for actuating article dispensers to dispense articles having various respective values, in response to the receipt of a corresponding longitudinal portion of an elongated key proportionate to the value of an article to be dispensed, and including means for deforming a portion of the key in proportion to the value of the article dispensed upon actuation of the dispenser, so as to prevent subsequent actuation of the device by the deformed portion of the key.

Therefore, it is an object of the present invention to provide an improved device for actuating an article dispenser.

Another object is to provide such a device which eliminates the need for change in coins and thereby avoids shut-down of vending operations by reasons of a scarcity of coins.

Another object is to provide such a device which allows the automatic vending of articles in accordance with their precise value to the nearest penny and even to fractions of pennies, if desired.

Another object is to provide such a device by which articles may be vended having a wide range of prices.

Another object is to provide such a device which allows convenient adjustment of the sales price for each article as necessary to reflect changes in value.

Another object is to provide such a device which eliminates the need for change machines.

Another object is to provide such a device which allows a sales manager or vendor better to anticipate the volume of future sales.

Another object is to provide such a device which allows the vendor to determine the identity of his customers and the volume of their purchases.

Another object is to provide such a device which allows the vendor to set sales prices on the various articles which correspond exactly to their value and thereby avoid the necessity of rounding off the sales price to the nearest five-cent increment.

These and other objects will become more fully apparent in the following specification and accompanying drawings.

Figure 1:
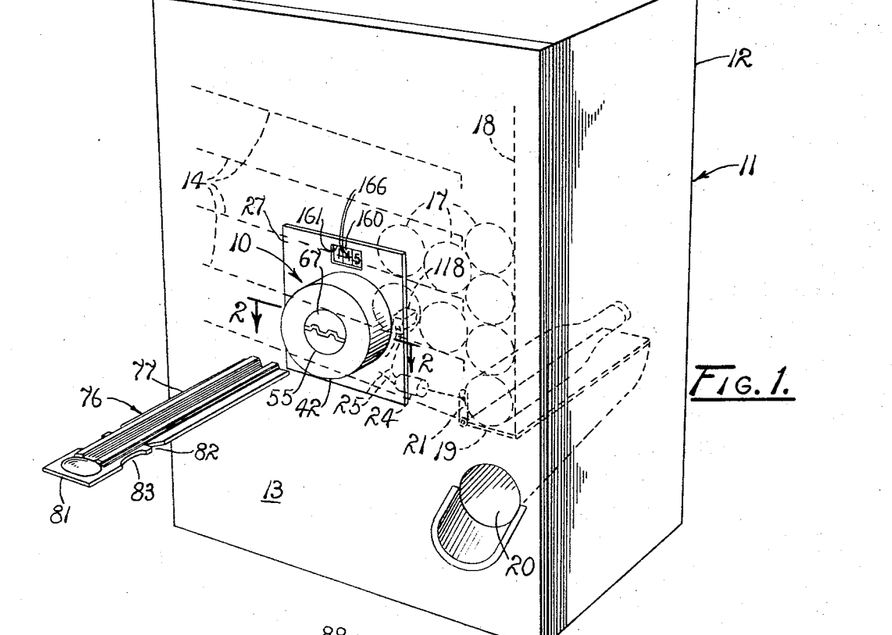
FIG. 1 is a schematic perspective view of a typical vending machine in which is mounted a respesentative actuation device embodying the principles of the present invention.

Referring more particularly to the drawings, a device embodying the principles of the present invention is shown generally at 10 mounted in a schematically depicted contemporary vending machine 11. The vending machine consists of an exterior housing 12 having a front wall 13 supporting the actuation device. A plurality of sloping ramps 14 are mounted in the housing and are adapted to accommodate articles to be dispensed, such as bottles 17 of various kinds of soft drinks, for rolling gravitational movement into a vertical feed chamber 18. A hinged trap door 19 is mounted at the bottom of the feed chamber and is adapted to pivot downwardly to release individual bottles for gravitational discharge through an outlet 20 for pick-up by a purchaser, not shown. The trap door is activated by any suitable type of mechanism known in the industry. For example, a lever arm 21 may be attached integrally to the trap door and connected to a solenoid activating mechanism 24 electrically energizable through conductors 25.

First form

Figure 2:
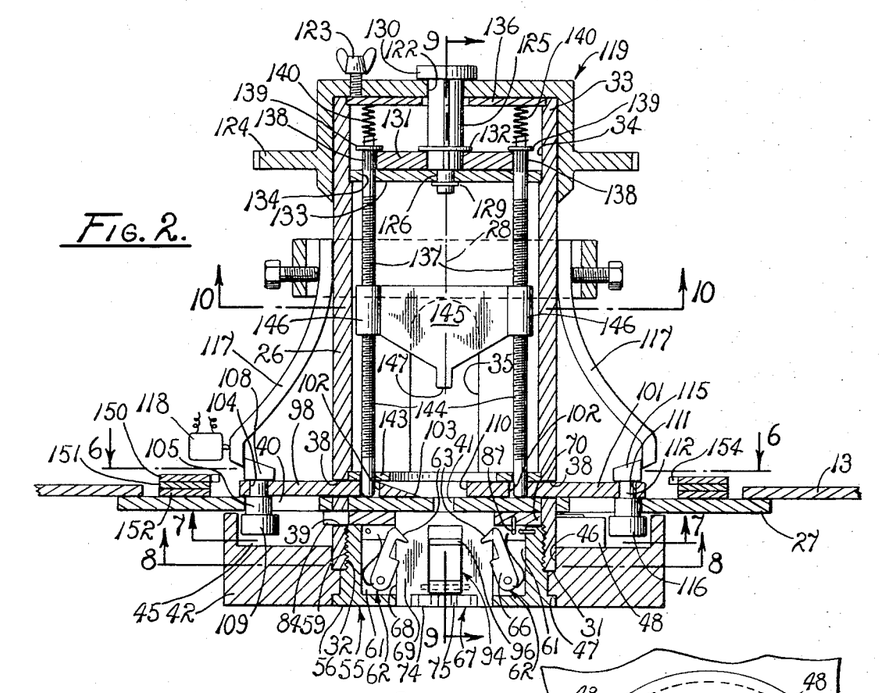
FIG. 2 is an enlarged transverse horizontal section of a first form of the actuation device of FIG. 1 taken in a plane represented by line 2—2.

A first form of the present invention, representing a mechanically operable device, is shown in FIG. 2. The device includes an elongated cylindrical receptacle or housing 26 secured to a plate 27 which is slotted to accommodate the housing. The plate is mounted on the vending machine 11 in an enlarged opening of the wall 13. The housing has a longitudinal axis 28. The housing has a front end 31 projecting forwardly of the mounting plate and having a threaded inner surface 32. The rear end portion 33 of the housing has a recessed inner surface 34 and the front and intermediate portions provide an enlarged opening 35, which accommodates the central portion of the mounting plate. Openings 38 are provided on both sides of the housing at the rear of the mounting plate. An arcuate slot 39 is provided in the housing on the left side thereof and at the front of the plate.

The mounting plate 27 has a pair of slotted side apertures 40 aligned perpendicularly with a central slotted keyway 41 and in bisecting symmetrically spaced relation thereto.

Figure 7:
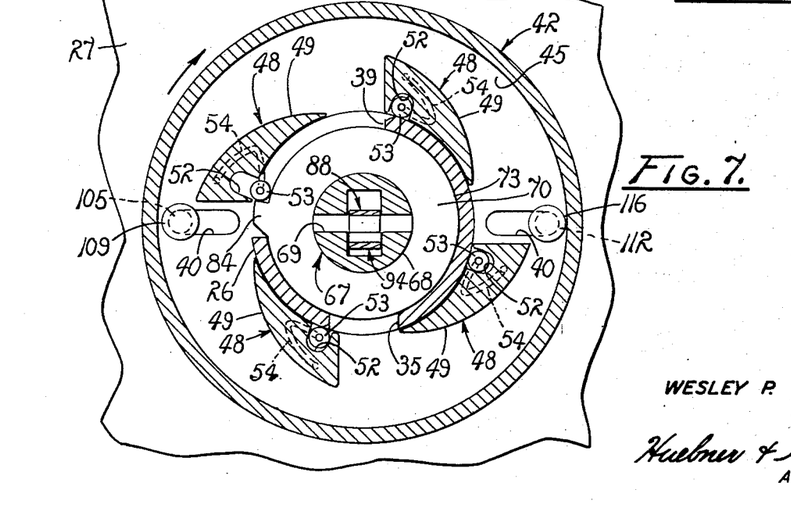
FIG. 7 is a transverse section of the device of FIG. 2 taken in a plane represented by line 7—7.

An annular cylindrical knob 42 is disposed against the front of mounting plate 27 and provides a hollow chamber 45 facing the plate. The knob has an inner cylindrical surface 46 bearing slidably against the housing 26 and providing an annular shoulder 47 disposed in slidable engagement with the front end 31 thereof. A series of four arcuate cams 48 project from the knob into the chamber 45, as shown in FIG. 7. Each cam has an arcuate surface 49 disposed generally in a clockwise direction and is provided with an elongated recess 52 extending radially of the knob, as shown in FIGS. 2 and 7. A knob positioning roller 53 is disposed in each recess and is biased in a radially inward direction by a spring 54 anchored to the corresponding cam. The position of the rollers 53 relative to the arcuate slot 39 is such that when the knob is turned so as to position a roller adjacent to the slot, the roller is forced into the slot by the spring.

Figure 8:
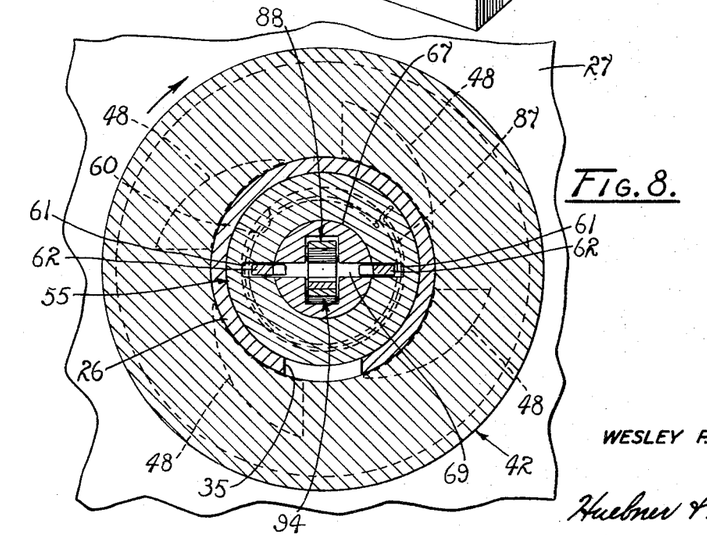
FIG. 8 is a somewhat diminished transverse section of the device of FIG. 2 taken in a plane represented by line 8—8.

A keeper ring 55 having a front face 56 and a threaded rearward end 59 is screw-threadably engaged with the front end of the housing 26. The rearward end of the ring is forwardly adjacent to the arcuate slot 39 and forms an annular chamber 60. The keeper has a pair of slotted chambers 61, as shown in FIG. 8, opening radially inwardly and disposed diametrically and symmetrically of the housing axis 28. A spring loaded pawl 62 is mounted in each slotted chamber, each of the pawls having a hooked end 63 and a substantially oval-shaped projecting portion 66. The keeper ring bears against the shoulder 47 of the knob 42 and serves to retain the knob in place.

Figures 3, 4, 5:
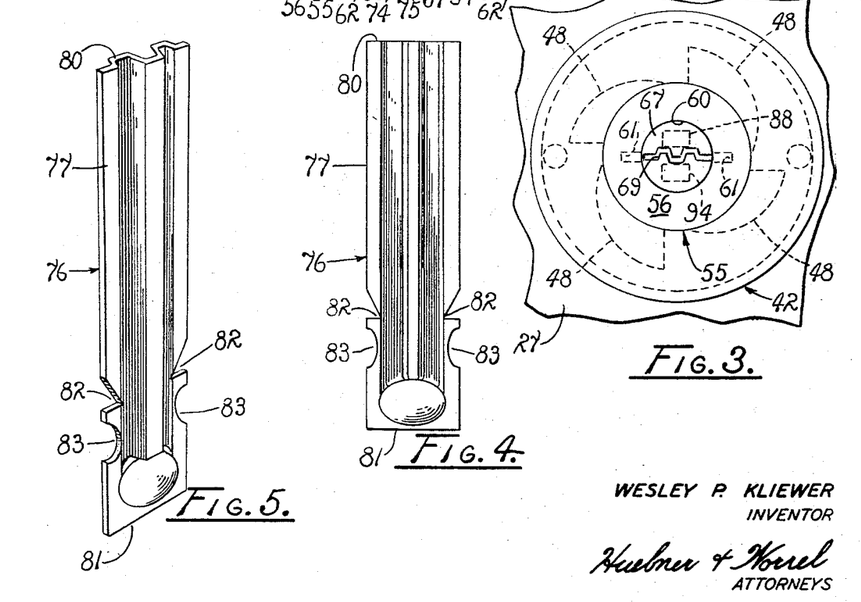
FIG. 3 is a somewhat diminished fragmentary front elevation of the device of FIG. 2 showing a key inserted therein between a pair of selector blades.
FIG. 4 is a plan view of a representative key usable with the device of FIG. 2.
FIG. 5 is a perspective view of the key of FIG. 4.

A key alignment barrel 67 is disposed in turning engagement within the keeper ring 55 and consists of a substantially cylindrical body 68 having a key receptacle or passageway 69 extending axially therethrough and a substantially annular base 70. The base has an outer rim 73 and is sandwiched between the mounting plate 27 and the keeper ring in sliding engagement therebetween. The barrel body has a hollow interior and a front wall 74 with a slot 75 having an irregular configuration corresponding to the cross-sectional configuration of a selected key such as that shown at 76 in FIGS. 4 and 5. The slot is therefore adapted to receive keys having only such selected configuration. A key suitable for the purpose of the present invention is formed of a rigid but deformable plastic material. As shown in FIG. 4, the key has preferably a rectangular operative portion 77 with a contact end 80, and a handle 81. The handle is preferably of a different cross-sectional configuration than the operative portion so as to prevent its insertion through the slot. However, alternatively, the edges may be shaped to provide recesses 82 for engaging the hooks 63 of the pawls 62, and recesses 83 for accommodating the oval-shaped portions 66 thereof, thereby adapting the key to be restrained by the pawls to prevent its being inserted too far.

A beveled lug 84 projects from the outer rim 73 of the barrel base 70 and is disposed in the arcuate slot 39. The barrel 67 is adapted to be rotationally reciprocated between a first position with the lug bearing against the housing 26 at the lower end of the slot, as viewed in FIG. 7, and a second position with the lug against the housing at the upper end thereof. A suitable torsion spring 87 is connected between the keeper ring 55 and the barrel 67 to urge the barrel into the first position. The barrel slot is perpendicular to the mounting plate keyway 41 when in the first position and in parallel alignment therewith when in the second position.

Figures 9, 10, 20:
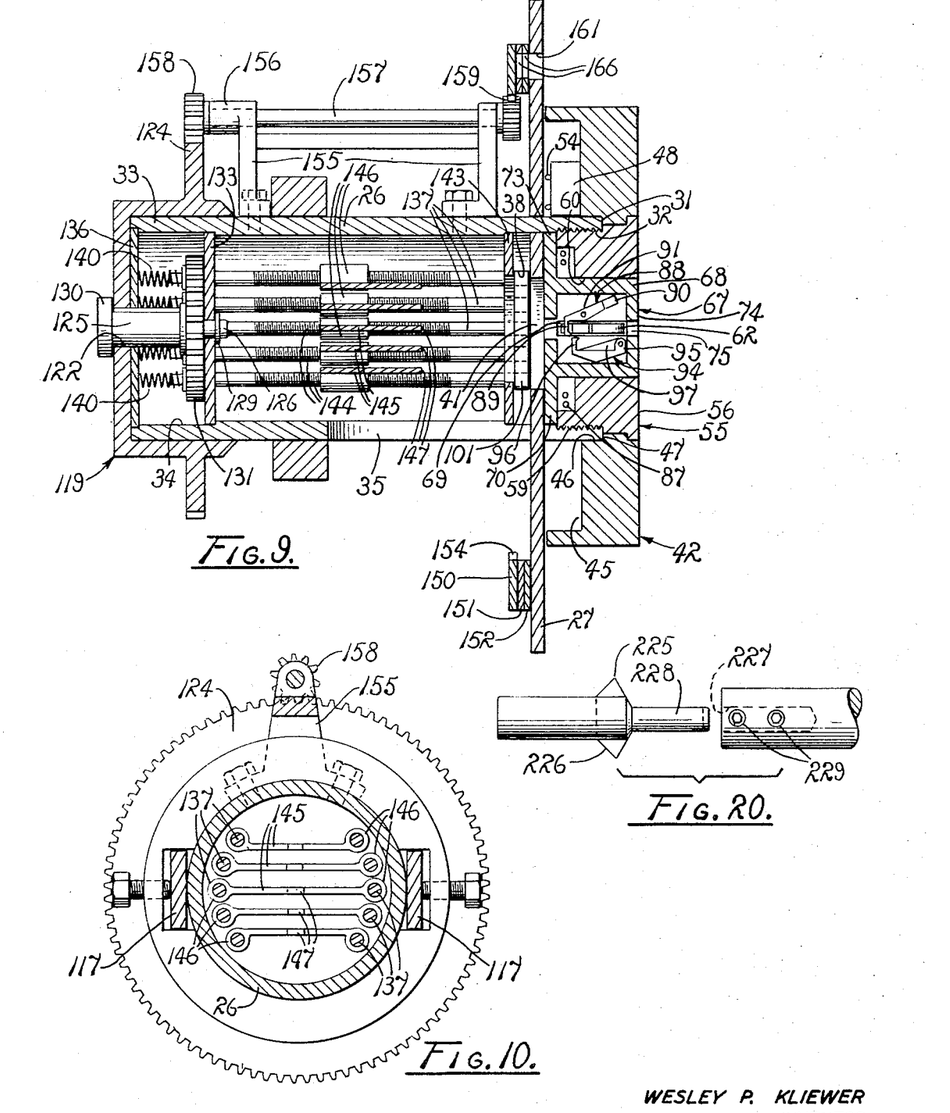
FIG. 9 is a longitudinal vertical section of the device of FIG. 2 taken in a plane represented by line 9—9.
FIG. 10 is a transverse section of the device of FIG. 2 taken in a plane represented by segmented line 10—10.
FIG. 20 is a side view of a portion of a mandrel associated with a slitter blade adapted to be used in the second and third forms of the present invention.

If desired, a key selector device may be mounted in the hollow interior of the barrel, as shown in FIG. 9. The selectivity of the particular type of device shown is based on the magnetic properties of the key 76 and, therefore, the keys to be utilized must be pre-conditioned to a predetermined degree of magnetism, which will be determinative of the selectivity required for the selector device. A plastic key having a predetermined quantity of iron particles therewithin may be used for this purpose. The selector device consists of a first lever 88 having a hooked end 89 normally disposed across the key receptacle 69, and an opposite magnetic end 90. The first lever is adapted to pivot about its center portion 91. A second lever 94 pivoted at one end 95 has a hooked opposite end 96 normally disposed in a retracted position relative to the key passageway, and a magnetic intermediate portion 97. The two magnetic portions are magnetically of the same pole but are magnetically opposite the pole of a key. The magnetic portion of the first lever 88 is of a sufficient degree of magnetism to be attracted to a key having a degree of magnetism at least above a certain predetermined amount. The magnetic portion of the second lever 94 is magnetically attractive to a key having a degree of magnetism greater than the degree of magnetism causing a response in the first lever. Consequently, the first lever 88 will retract from the key passageway and the second lever will remain retracted therefrom only if a key is inserted having the predetermined degree of magnetism.

Figure 6:
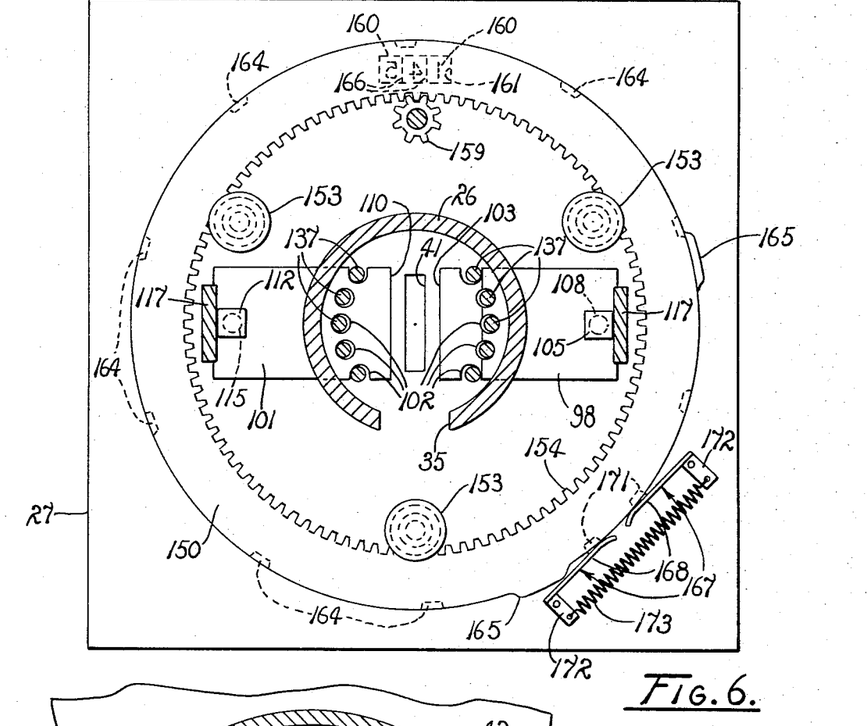
FIG. 6 is a transverse section of the device of FIG. 2 taken in a plane represented by line 6—6 therein.

A key alteration blade 98 and a vise jaw 101 are slidably disposed against the inner face of the mounting plate 27 in diametrically opposed relation to the housing axis 28. The blade and vise jaw extend through the corresponding openings 38 in the housing and are each perforated with a plurality of locking holes 102 as shown in FIG. 6. The blade has a sharpened end 103 facing radially inwardly and a rounded hole 104 in its opposite end. A blade actuation pin 105 is disposed through the hole and provides a contact head 108 at its rearward end and a cam follower roller 109 at its front end. The pin extends through the mounting plate aperture 40 so that the roller is disposed in the knob chamber 45 for rolling engagement with a cam 48 when the knob 42 is turned clockwise.

The vise jaw 101 provides a percussion end 110 facing the blade 98 and an opposite end having a hole 111 therethrough. A vise jaw actuation pin 112 is disposed through the hole and provides a contact head 115 at its rearward end and a roller 116 at its front end, similar to the actuation pin 105 and related elements for the blade 98. The vise jaw pin extends through the corresponding aperture 40 of the mounting plate 27 so that the roller is disposed in the knob chamber 45 for rolling engagement with a cam 48 upon clockwise turning of the knob 42.

A pair of elongated leaf springs 117 are secured to the housing 26 for propulsion of the blade 98 and vise jaw 101. The springs are disposed in biased engagement against the respective contact heads 108 and 115. One spring, for instance the spring engaging the knife blade, is disposed in alignment with an acutation switch 118 for engagement thereof upon being moved into a position preparatory to propulsion of the blade, as shown in FIG. 2. The conductors 25 connect the switch to the door activation solenoid 24.

A cup-shaped knob 119 is disposed in cupped slidable relation on the rear end of the housing 26. The knob has a central aperture 122, and an eccentrically disposed threaded aperture for a lock screw 123. A ring gear 124 is secured to the exterior surface of the knob. A shaft 125 is keyed to the knob through the central aperture. The forward end of the shaft provides a reduced-diameter portion 126 having a retaining pin 129 disposed therethrough. The rearward end of the shaft has an enlarge head 130 seated against the knob.

An annular gear 131 is keyed to the forward end of the shaft 125 and is retained thereon by a suitable gear retainer 132 and a retainer disc 133 affixed firmly to the recessed portion 34 of the housing 26. The disc accommodates the reduced-diameter portion 126 of the shaft in journaled engagement therewith and provides a plurality of holes 134 corresponding in number to the locking holes 102 of the blade 98 and vise jaw 101, and in axial alignment therewith. The retainer disc maintains a fixed position relative to the gear 131 and shaft, which may be rotated freely as a unit with the knob when the locking screw 123 is in a released position. A backing plate 136 is mounted on the rear end of the housing.

A plurality of elongated locking pins 137 corresponding in number to the holes 102 in the key alteration blade 98 and vise jaw 101, and aligned respectively in registry therewith, extend through the housing 26 and are supported in the respective holes 134 in the retainer disc 133. The rear end portions of the locking pins provide pinion gears 138 and have annular shoulders 139 for seating compression springs 140 biased against the backing plate 136. The pinion gears are enmeshed with the gear 131. The forward ends of the locking pins are biased forwardly for locking engagement with the respective holes in the blade and vise jaw. The pins are preferably supported for axially aligned movement by guide members secured to the housing.

The intermediate portions 144 of the locking pins 137 are threaded. A contact or stop plate 145 is provided for each corresponding pair of locking pins disposed symmetrically of the housing axis 28. Each contact plate has cylindrical end portions 146 threaded interiorly thereof for threaded sleeved engagement with the respective locking pins. By turning the knob 119, the gear 131 is caused to rotate and, through the pinion gears 138, synchronously to adjust the positions of the contact plates longitudinally of the housing. The contact plates each have a forwardly projecting portion terminating in a contact surface 147, all of the surfaces being disposed in facing relationship to the mounting plate keyway 41 for contact with a key 76 disposed through said keyway. The respective contact surfaces are aligned parallel to the contact end 80 of the key so as to provide simultaneous contact between all of the contact plates and the key, such as is indicated in FIG. 10.

The uniform spacing of the contact surfaces 147 from the mounting plate keyway 41 determines the sales price selected for the corresponding article to be dispensed. The knob 119 is preferably calibrated and indexed so that its rotational position automatically indicates the spacing of the contact surfaces as well as the corresponding sales price.

The ring gear 124 may be utilized in conjunction with a price-display mechanism if it is desired conveniently to indicate to customers the selected price. A suitable mechanism for this purpose consists of a set of rotatable annular display discs 150, 151 and 152 mounted concentrically on the rear of the mounting plate 27 by means of flanged rollers 153. Disc 150 is provided with gear teeth 154 around its interior surface and is driven by means of a pinion gear member supported on the housing 26 by means of a bracket 155 and bearing 156. The pinion gear member consists of a shaft 157 having pinion gears 158 and 159 at its respective ends, gear 158 being engaged with the ring gear 124 and gear 159 being engaged with the gear teeth of disc 150. The remaining gears are generally driven by frictional contact with each other and with gear 150, which may be supplemented by the action of inter-locking indentations, not shown, on the engaged surfaces of the respective discs. A series of price display numerals 160 are provided around the peripheral front surfaces of the discs and are visible through corresponding spaces in a window 161 in the mounting plate. A pawl engagement notch 164 is disposed adjacent to each digit on discs 151 and 152, and discs 150 and 151 each have a pawl release cam 165. The numerals on disc 152 represent digits extending from zero through nine. The numerals on disc 151 and 150 are decimal digits representing tenths and hundredths respectively and extending from zero through nine. At the right of each digit in discs 151 and 152, an opening is provided for viewing the numerals in discs 150 and 151, as shown in FIG. 6.

The discs 151 and 152 are normally restrained in fixed position to allow only single-numeral rotation thereof upon a complete rotation of the immediately rearward disc 151 or 150. The discs are so restrained by means of a pair of pawls 167 pivotally connected to the mounting plate 27. Each pawl has a lever arm 168 terminating in a locking finger 171 normally engaged in a pawl engagement notch of the corresponding disc. The pawls each have an ear 172 projecting away from the discs and connected to each other by a coiled tension spring 173. The pawl engagement notches allow holding the corresponding discs in fixed position with selected numerals 160 aligned in their corresponding spaces in the window 161. The coil spring biases the lever arm into engagement with the respective discs 151 and 152 so that the fingers are disposed within the corresponding notches 164 to lock the disc in this fixed relationship until the pawl arms are urged away from the discs against the force of the spring. The cams 165 are positioned respectively to urge the pawls away from the notches when it is necessary to rotate the corresponding disc to the next numeral, representing a complete cycle of ten numerals on the immediately rearward disc 150 or 151. The discs are consequently synchronized with the adjustment knob to allow display of any sales price from one cent ($0.01) to nine dollars and ninety-nine cents ($9.99), representing the corresponding spacing of the contact surfaces 147 from the keyway 41. It is, of course, possible to display sales prices of higher amounts merely by adding a disc for each additional digital representation desired.

*Operation of the first form*

The operation of the above described first form of the present invention is believed to be readily apparent and is briefly described at this point. Initially, a key 76 is selected to conform to the configurational requirements of the barrel slot 75, or vice versa as the case may be, and is cut to a length which will represent the value of the key in buying dispensable articles. For a selected article to be vended, the contact plates 145 are adjusted within the housing by rotation of the adjustment knob 119 to position the contact surfaces 147 at a distance from the keyway 41 corresponding to the price of the article. At the same time, the price display discs 150, 151 and 152 are automatically rotated through their association with the ring gear 124 so as to display the selected price in the window 161. The blade 98 and vise jaw 101 are initially held in a locked position by the locking pins 137 disposed respectively through the holes 102. The leaf springs 117 are biased respectively against the blade and vise jaw contact heads 108 and 115 and the leaf spring for the blade is resting against the actuation switch 118 which remains in an unactuated condition.

The key 76 is then inserted in the slot 75 which is held in substantially a horizontal orientation by the pawls 62. The selector mechanism detects the magnetism of the key and if it is of a sufficiently high degree of magnetism and not more than a selected degree of magnetism, the respective levers 88 and 94 allow the key to be inserted in the receptacle 69. The key thereby forces the pawls 62 away from the receptacle and allows the barrel 67 to be rotated ninety (90) degrees clockwise. The key is then urged through the keyway 41 into the housing 26 until it makes contact with all of the contact surfaces 147. During the ninety (90) degree clockwise rotation of the barrel 67 to the right, the lug 84 contacts the knob positioning roller 53 biased into the arcuate slot 39 and thus turns the knob 42. This serves to move the knob cams 48 away from the projected path of the actuation pin rollers 105 and 112 to allow a full unrestricted course of the blade 98 and vise jaw 101 upon their release. If the operative portion 77 of the key is not long enough to reach the contact surfaces, the handle 81 is restrained either at the slot or in the receptacle, by the pawls.

The key 76 is then pressed against the contact surfaces 147 to urge the contact plates 145 rearwardly of the device, thereby releasing the locking pins 137 from their positions in the respective holes 102 of the blade 98 and vise jaw 101. Upon their release, the blade and vise jaw are propelled against each other with such forceful impact that the blade effectively slices through the key to sever the selected portion thereof. The severed portion of the key falls automatically through the opening 35 in the housing 26 to free the housing for subsequent operation. The key is then removed to free the barrel for counter-clockwise spring-biased movement into its original position.

The purchaser then rotates the knob 42 ninety (90) degrees clockwise so that the cams 48 engage the adjacent actuation pin rollers 109 and 116 to move them into their first locked position, as shown in FIG. 2. When the spring 117 biased against the contact head 109 meets the actuation switch 118, the activation solenoid 24 is activated to dispense the desired article. At the same time, the springs 140 urge the locking pins 137 forwardly into the locking holes of the blade and vise jaw so that they are again disposed in engagement therewith.

At this stage, the pawls 62 resume their engagement with the barrel 67 so that the barrel cannot be rotated except by a key 76 having the configuration selected by the vendor. The blade 98 and vise jaw 101 are held in a locked position ready for subsequent operation. If the original key has an operative length sufficient to reach the contact surfaces 147 in the housing 26, it may be used again for dispensing an additional article.

From the above description, it can readily be seen that the device possesses several features securing it from unauthorized operation or tampering. If a key 76 is inserted into the slot 75 and it does not have the cross-sectional configuration thereof it will be blocked from further passage therethrough. Further, only a key having the predetermined degree of magnetism can pass between the levers 88 and 94. Next, if the key is of insufficient width, it will not disengage the pawls 62 so as to allow rotation of the barrel 67. Finally, since all of the contact plates 145 must be displaced rearwardly to free either the blade 98 or the vise jaw 101, a key of insufficient width will not actuate either, since it will leave at least one pair of locking pins 137 still disposed in locking engagement with both the vise jaw and the blade.

Between actuation sequences of the device, the knob 42 is freely rotatable. This feature represents a significant advantage, since fixed or rigidly connected knobs are quite susceptible to damage through inadvertent and forceful turning of the knobs when they are not ready for operation. This results in frequently broken knobs and actuation mechanisms, as well as disrupted service.

Second form

Figures 11, 12, 13, 14, 15:
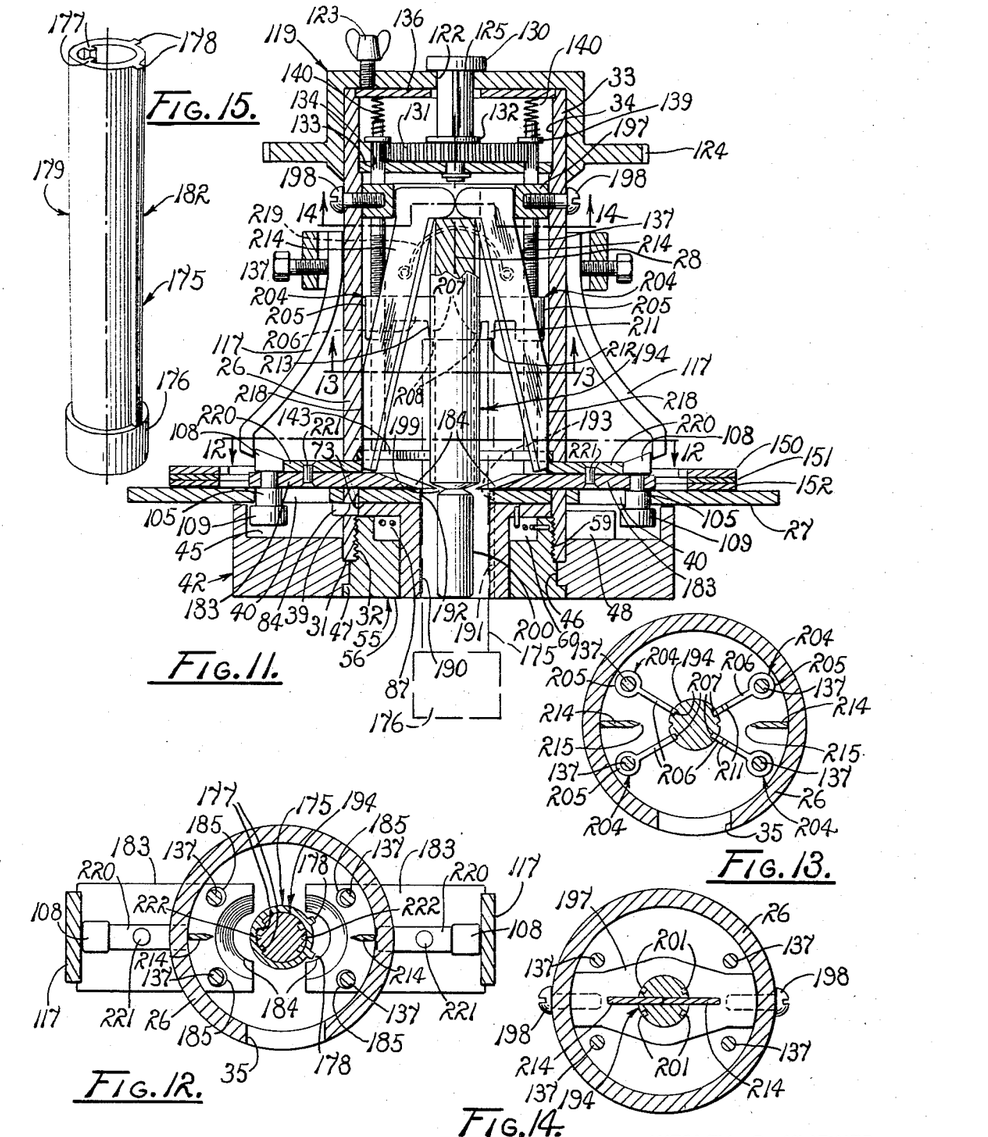
FIG. 11 is a longitudinal horizontal section of the representative device shown in FIG. 1 taken in the plane of FIG. 2 and showing a second form of the present invention.
FIG. 12 is a transverse section of the device of FIG. 11 taken in a plane represented by the line 12—12.
FIG. 13 is a transverse section of the device of FIG. 11 taken in a plane represented by line 13—13.
FIG. 14 is a transverse section of the device of FIG. 11 taken in a plane represented by line 14—14.
FIG. 15 is a perspective view of a key adapted to be used in the device of FIG. 11.
Figure 16:
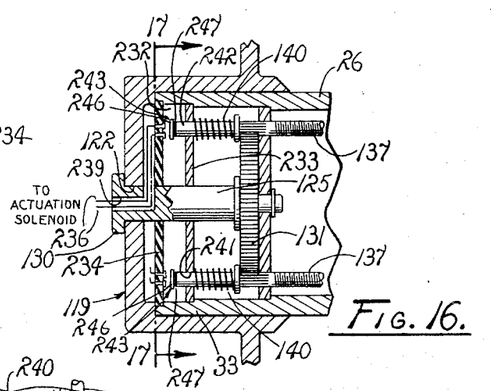
FIG. 16 is a fragmentary longitudinal vertical section of the representative device of FIG. 1 showing part of a third form of the present invention.
Figure 17:
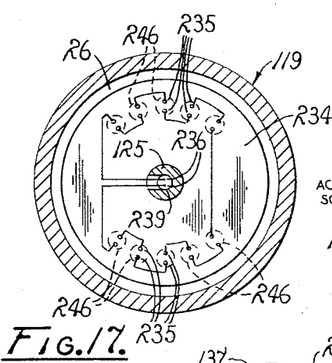
FIG. 17 is a transverse section of the device of FIG. 16 taken in a plane represented by line 17—17.

A second form of the present invention is adapted for use with a hollow cylindrical key 175 such as is shown in FIG. 15. The key preferably has an enlarged handle 176 and is cut to a length representing proportionately the value of articles which it may purchase. The interior and exterior surfaces of the key are provided respectively with elongated projections 177 and 178 extending the length of the key. A predetermined number of projections are disposed along each half portion 179 and 182, respectively, of the key. The key is preferably formed of a rigid deformable plastic material, substantially similar to the key 76 of the first form.

A second form of device 10 is shown generally in FIG. 11. It generally includes components substantially similar to those of the first form and designated by identical numbers in the drawings. However, in contrast to the first form, it has two opposed key alteration blades 183, with arcuate knife edges 184. Both blades are provided with actuation leaf springs 117 mounted on the housing 26 and engaged with the contact heads 108 of the blades, as with the blade 98 in the first form. The knife blades 183 each have a plurality of locking holes 185 corresponding in number to the projections 178 and 177 on the respective half portions 179 and 182 of the key 175. A plurality of elongated locking pins 137 corresponding in number to the respective holes in the knife blades are mounted longitudinally in the housing 26 in registry with said holes, as in the first form.

The key alignment barrel 67 has a substantially cylindrical receptacle 190 with axial grooves 191 along the wall thereof for accommodation of the key projections. The barrel is otherwise substantially the same as in the first form and its associated elements are identically numbered in the drawings. The pawls 62 of the first form may be eliminated from the keeper ring 55 in the second form if desired. The device mounting plate 27 provides a circular keyway 192 having notches 193 therein adapted to receive the outer projections 178 of the key when rotated ninety (90) degrees clockwise from its initial position in the barrel. The notches in the keyway are located so that a key inserted therein is disposed with its opposite half portions 179 and 182 disposed in respective correspondence with the respective blades 183. By rotation of the barrel, the key is oriented for entry through the mounting plate keyway into the housing.

An elongated mandrel 194 is disposed concentrically through the housing 26 and barrel receptacle 190. It is mounted on a mounting block 197 attached to the interior of the housing by screws 198. The mandrel has an annular V-shaped groove 199 disposed in registry with the knife blades 183. The forward end portion 200 of the mandrel is of reduced diameter for accommodation of the key 175 without obstruction of the inner projections 177 thereof. The portion of the mandrel disposed in the rearward key receptacle or housing 26 is provided with grooves 201 aligned longitudinally thereof and spaced about the surface of the mandrel in corresponding registry with the projections of a key disposed through the keyway 192.

A key stop or contact member 204 is slidably disposed in each groove 201. Each contact member has an interiorly threaded collar 205 screw-threadably engaged with the threaded portion 144 of a corresponding locking pin 137 and connected through a radial arm 206 to a runner 207 slidably disposed in the corresponding groove. Each runner provides a contact surface 208 disposed in forwardly facing relation in the corresponding groove for contact with an interior projection 177 of a key 175. For each exterior projection 178 of a key, a finger 211 extends from the arm on the corresponding contact member and provides a contact surface 212 disposed in forwardly facing registry with the key projection. All of the contact surfaces provided by the respective contact members are disposed preferably in a common plane of orientation substantially perpendicular to the axis 28 of the housing.

The contact member runners 207 are tapered rearwardly of the device in a radially outwardly direction, as shown at 213, so as to grip a key 175 forced onto the mandrel 194 and not having the necessary inner projections 177 to engage the respective contact surfaces 208.

A pair of elongated shear blades 214 may be utilized for splitting the severed portion of a key 175 within the housing 26 for disposal thereof, thereby to clear the housing for subsequent operation of the device. The shear blades are pivotally mounted on the mandrel mounting block 197 and have sharpened inner edges 215 for shearing engagement with a key disposed on the mandrel 194, and beveled outer edges 218 to allow retraction of the blades from the mandrel for subsequent operation. The shear blades are biased away from the mandrel by a leaf spring 219. Their forward ends are respectively engaged with drive plates 220 secured to the respective knife blades 183 by screws 221 or the like. A pair of grooves 222 may be provided on opposite sides of the mandrel for receipt of the respective shear blades when propelled against the mandrel to sever portions of the key.

As an alternative to the shear blades, a slitter blade member 225 may be used. The slitter blade is preferably attached to the reduced-diameter portion 200 of the mandrel 194 and provides sharpened edges 226 for slicing a key 175 as it is passed onto the mandrel into the housing 26. For this purpose, the reduced-diameter portion of the mandrel forms a separate piece which is removable from the rearward portion. The rearward portion of the mandrel contains an aperture 227 in its forward end for receipt of an elongated tongue 228 extending from the reduced-diameter portion. The slitter blade is seated on the tongue and the mandrel is assembled and secured by bolts 229. The slitter blade is thereby held in firm engagement between the reduced-diameter portion of the mandrel and the rearward portion thereof.

Operation of the second form

The operation of the second form of the present invention is believed to be readily apparent and is briefly described at this point. Initially, as with the first form of the invention, the price adjustment knob 119 is rotated as necessary to space the contact surfaces 208 and 212 of the contact members 204 at a selected distance from the mounting plate keyway 192 corresponding to the sales price desired for the particular article to be dispensed. As the knob is turned, the price display discs 150, 151 and 152 are automatically positioned to display the desired price in the display window 161, thereby to indicate when the contact members are in position for operation.

A key 175 having the requisite length for purchase of the article is inserted in the barrel receptacle 190 so that its exterior projections 178 are engaged in the grooves 191. The key and the barrel are rotated clockwise a quarter turn as previously described for the first form. During this rotation the lug 84 on the barrel base 73 engages a cam follower roller 109 so as to position the cams 48 away from the projected path of propulsion of the cam follower rollers. After rotation of the barrel, the outer projections 178 of the key are aligned with the notches 193 in the mounting plate keyway 192 to allow further movement of the key into the housing. If the optional key slitter blades 225 are utilized, the key is split longitudinally by the forceful movement of the key onto the mandrel 194.

As the key 175 is moved into the housing 26, its interior projections 177 are received in the grooves 201 of the mandrel 194 to guide the key in sliding engagement therealong. The interior and exterior projections on the key engage the respective contact surfaces 208 and 212 of the contact members 204 so that the selected length of key corresponding to the price of an article to be dispensed is disposed rearwardly of the V-shaped groove 199 in the mandrel. The key is then pressed against the contact members to force them rearwardly and to disengage the locking pins 137 from the blade holes 185. The blades 183 are thereupon forcefully propelled by the springs 117 into the V-shaped groove on the mandrel to sever the selected portion of the key.

When the shear blades 214 are utilized, they are pivoted forcefully inward by the leaf springs 117, substantially simultaneously with the propulsion of the knife blades. The shear blades engage the elongated grooves 222 in the mandrel 194 effectively to shear the key into longitudinal segments, not shown, which thereupon fall away from the mandrel for gravitational discharge through the opening 35 in the housing 26. The housing is thereby cleared for subsequent operation. The key is then removed from the receptacle 190 and the barrel 67 returns to its original position under the force of the torsion sping 87. The purchaser then rotates the actuation knob 42 at least ninety (90) degrees clockwise so that two opposite cams 48 engage the cam follower rollers 109 to move the blades 183 radially outwardly into a cocked position, whereupon the locking pins 137 become engaged with the blade locking holes 185. At the same time the shear blades 214, when used, are reset radially outwardly by their connecting leaf spring 219.

Upon rotation of the knob 42 to cock the blades 183, the contact head 108 and associated leaf spring 117 is moved into contact with the actuation switch 118, thereby actuating the activation solenoid 24 of the vending machine 11 and dispensing the selected article. The actuation device 10 is then ready for subsequent operation as desired, with the actuation knob 42 freely rotatable to avoid inadvertent damage thereto by customers.

*Third form*

A third form of device embodying the principles of the present invention is shown generally in FIGS. 16 through 19. This form represents an electrically energizable embodiment of the invention. It is adapted to be utilized in conjunction either with a key 76 of the first form or a cylindrical key 175 of the second form; however, the following description will be conveniently limited to a device adapted to be actuated by a key 76 having the general configurational characteristics shown in FIGS. 4 and 5.

The basic structure of this form of device is substantially similar to that of the first two forms, with certain modifications, as will be described below, and structural elements common to all forms are numbered identically in the drawings. A chamber 232 is provided at the rearward end of the housing 26, being formed by a supplementary retaining disc 233, and a circuit disc 234 formed of a suitable di-electric material and wired to provide a plurality of normally open contacts 235 corresponding in number and axial alignment to the respective locking pins 137. Two conductors 236 of the circuit disc extend through a passageway 239 in the actuation shaft 125 and lead outwardly of the shaft head 130 for connection through a suitable source of electrical energy, not shown, to an actuation solenoid 240. The supplementary retaining disc provides a series of holes 241 for the respective locking pins. The locking pins each have an extended pinhead 242 extending through the supplementary disc and terminating adjacently of a corresponding pair of contacts 235. Coil springs 140 are seated respectively on annular shoulders 139 circumscibing the pinheads and are biased against the supplementary disc to urge the locking pins forwardly of the device. The pinheads each have a switch element 243 consisting of a conductor disc 244 secured to a di-electric plug 247, for closing a corresponding pair of contacts in the circuit disc.

Figure 18:
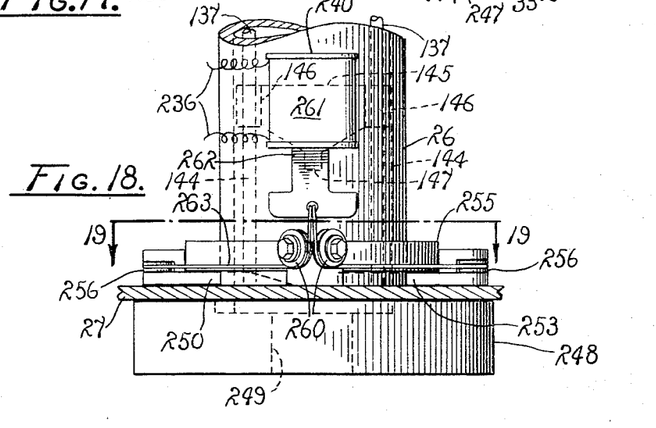
FIG. 18 is a fragmentary side view of the third form of device showing a housing with a solenoid mounted thereon in association with related actuation elements.

The housing 26 is connected to the vending machine wall 13 by means of a mounting plate 27 to which the housing is secured by a keeper ring 248. The keeper ring may be substantially flush with the mounting plate or may be enlarged as shown in FIG. 18 to provide sufficient interior space for utilization of a key selector device or other elements if desired, as described in the first form. The keeper ring provides a slotted receptacle 249 preferably having an irregular configuration adapted to receive keys having only a selected cross-sectional configuration, such as the key 76, shown in FIGS. 4 and 5. The mounting plate also provides a slotted keyway 41 for passage of a key into the housing receptacle.

A plurality of key contact plates 145 having radially outward cylindrical sleeves 146 with threaded interiors are mounted on the threaded portions 144 of the locking pins 137 with the cylindrical portions in sleeved threaded engagement thereon, as in the first form. The plates provide contact surfaces 147 disposed in spaced aligned relation with the keyway 41 at a selected distance therefrom corresponding proportionately to the price selected for the article to be dispensed.

A key alteration knife blade 250 and a vise jaw 253 in opposition thereto are disposed in sliding engagement through the housing 26 adjacently of the keyway. The knife blade and vise jaw preferably each have a series of holes 254 adapted to receive the locking pins 137 in locked engagement therewith when the respective knife blade and vise jaw are retracted from the key receptacle. A reset spring 255 biases the blade and jaw radially outwardly in a normally clocked position.

Figure 19:
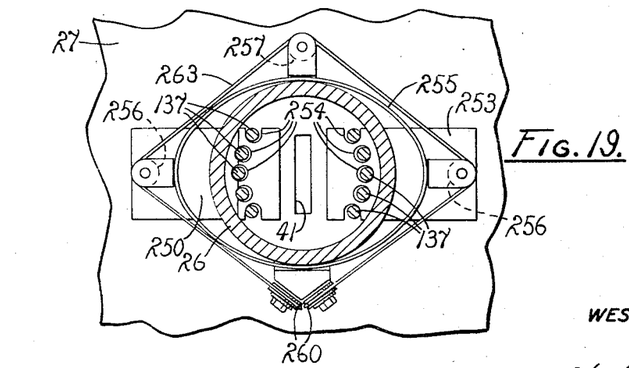
FIG. 19 is a transverse section of the device of FIG. 18 taken in a plane represented by line 19—19.

Pulleys 256 are bracketed respectively to the radially outward portions of the knife blade 250 and vise jaw 253 for rotation as indicated in FIG. 18. A similar pulley 257 is bracketed to the housing, intermediate the blade and vise jaw, as shown in FIG. 19. A pair of pulleys 260 are bracketed to the opposite side of the housing from pulley 257, for rotation as shown in FIGS. 18 and 19.

The actuation solenoid 240 is mounted on the side of the housing 26 and consists of an electrically energizable coil schematically indicated at 261 and an actuation plunger 262 attached to a cable 263. The cable extends from the plunger to the pulleys 260, from which the cable extends continuously around pulleys 256 and 257.

The actuation plunger 262 is disposed in a normally extended position relative to the coil 261, and the cable 263 is held in a normally taut position by the spring 255 for the knife blade 250 and vise jaw 253.

Although the conductors 25 for the activation solenoid 24 of the vending machine 11 may be connected to conductors 236 leading from the price adjustment knob 119 for activating the trap door 19, the actuation solenoid plunger 262 can also be utilized directly to activate the trap door by a suitable cable connection therebetween, not shown.

*Operation of the third form*

The operation of the third form of the present invention is believed to be readily apparent and is briefly described at this point. As with the previous two forms, the contact plates 145 are adjusted to dispose the contact surfaces 147 at the desired distance from the mounting plate keyway 41 by means of the adjustment knob 119. The knife blade 250 and vise jaw 253 are initially in a retracted position relative to the key receptacle 249 and are held in that position by means of the spring 255. The key 76 is inserted into the key receptacle and is pushed into the housing 26 until it makes contact with the contact surfaces of the plates. Upon forcefully pushing the key further, the plates are driven rearwardly of the device to carry the locking pin switch elements 243 into switching engagement across the normally open contacts 235 of the circuit disc 234. This closes an electric circuit which is thereupon electrically energized and sends an electric current to the solenoid coil 261 which in turn causes the plunger 262 to retract and forcefully to propel the knife blade 250 and vise jaw 253 against one another by means of the cable 263. The portion of the key within the housing is thereby severed. Thereupon, the locking pins 137 are urged forwardly of the device by the springs 140 to disengage the switch elements from across the contacts in the circuit discs so that the solenoid is no longer energized. This allows the reset spring 255 forcefully to retract the knife blade and vise jaw from the key receptacle into a cocked position preparatory to subsequent operation. The locking pins 137 thereupon become re-engaged with the locking holes 254 to lock the blade and vise jaw in the cocked position and prevent their propulsion by separate energization of the solenoid 240.

Substantially simultaneously with the propulsion of the knife blade 250 and vise jaw 253, the electric circuit, if used for this purpose, also energizes the vending machine activation solenoid 24. Alternatively, the actuated solenoid plunger 262 actuates the trap door 19 through a cable-and-pulley arrangement, not shown, so that the vending machine 11 is caused to dispense the desired article. The key 76 may be removed from the device at any time after the selected portion thereof has been severed, and the device is then ready for subsequent operation as desired.

From the foregoing, it is readily apparent that an improved device for actuating an article dispenser has been provided which eliminates the need for change in coins and allows the vending of articles in accordance with their precise value. The device may be conveniently adjusted to reflect current changes in the value of articles. It allows the vendor to maintain selective control over the means for purchasing his articles and to project the amount of future sales and volume of supply required. It is adapted to be used for any type of vending machine, whether it be electrically or mechanically activatable.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An actuation device controllable by an elongated key having a predetermined cross-sectional configuration along at least a portion of its length, said portion being determinative of the control of the device by said key, comprising a housing providing an aperture adapted to accommodate the predetermined configurational portion of the key in predetermined longitudinal alignment, said housing having front and rear portions respectively; stop means disposed at the rear of said housing in alignment with the key when said key is disposed in said aperture, said stop means being disposed in spaced relation to the housing at adjustable selected distances therefrom, and being adapted resiliently to yield to pressure from the key when disposed in the aperture; key alteration means disposed at the rear of the housing in operable association with the stop means for selected alteration of the key in response to said yielding of the stop means; and means operably associated with the alteration means for providing an actuation signal, said means for providing an actuation signal being rendered operable upon said alteration of the key.

2. In combination with a dispensing machine having an activating unit for making a selected item of predetermined value available to a user, an elongated key having a predetermined cross-sectional configuration along at least a portion of its longitudinal extent, a control device associated with the machine comprising a housing providing an aperture adapted to accommodate the predetermined configurational portion of the key in predetermined longitudinal alignment, said housing having front and rear portions respectively; stop means disposed at the rear of said housing in alignment with the key when said key is disposed in said aperture, said stop means being disposed in spaced relation to the housing at adjustable selected distances therefrom corresponding proportionately to the value of said item and being adapted resiliently to yield to pressure from the key when disposed in the aperture; key alteration means disposed at the rear of the housing in operable association with the stop means for selected alteration of a predetermined section of the configurational portion of the key corresponding proportionately to said value in response to said yielding of the stop means; and means operably associated with the activating unit for actuating the activating unit upon said selected alteration of the key.

3. The combination of claim 2 wherein the stop means comprises a stop member having a key contact surface; and including an elongated locking member adjustably secured to the stop member and having first and second opposite ends respectively, said stop member being positionable in selected positions along said locking member; support means mounting said locking member at the rear of the housing with its first end disposed substantially adjacently thereof and its second end disposed remotely thereof whereby said stop member is disposed with its contact surface facing the aperture in alignment with the key when said key is disposed in said aperture, said locking member being adapted to be moved between a first position of locking engagement with the key alteration means in the first position of said alteration means and a second position removed from said alteration means; and means associated with the support means resiliently urging the locking member and stop member toward said aperture whereby when said key is pressed against said contact surface the stop member and locking member resiliently yield to move the locking member into said second position.

4. The combination of claim 2 wherein the stop means comprises a stop member having a key contact surface; and including an elongated locking member adjustably secured to the stop member and having first and second opposite ends respectively, said stop member being positionable in selected positions along said locking member; support means mounting said locking member at the rear of the housing with its first end disposed adjacently thereof and its second end disposed remotely thereof whereby said stop member is disposed with its contact surface facing the aperture in alignment with the key when said key is disposed in said aperture, said locking member being adapted to be moved between a first position and a second position further removed from the housing than the first position; means associated with the support means resiliently urging the locking member and stop member toward said aperture whereby when said key is pressed against said contact surface the stop member and locking member resiliently yield to move the locking member into said second position; an electrically energizable solenoid connected to the activating unit for activating the same upon energization of the solenoid; a source of electrical energy; normally open switch means operably associated with the second end of the locking member and adapted to be closed upon movement of the locking member into said second position; and conductor means connecting in series the switch means, the source of energy and the solenoid for energization of the solenoid upon said movement of the locking member into the second position.

5. The combination of claim 2 wherein the stop means comprises a stop member having a key contact surface; and including an elongated locking member adjustably secured to the stop member and having first and second opposite ends respectively, said stop member being positionable in selected positions along said locking member; support means mounting said locking member at the rear of the housing with its first end disposed adjacently thereof and its second end disposed remotely thereof whereby said stop member is disposed with its contact surface facing the aperture in alignment with the key when said key is disposed in said aperture, said locking member being adapted to be moved between a first position and a second position further removed from the housing than the first position; means associated with the support means resiliently urging the locking member and stop member toward said aperture whereby when said key is pressed against said contact surface the stop member and locking member resiliently yield to move the locking member into said second position; an electrically energizable solenoid connected to the activating unit for activating same upon energization of the solenoid; a source of electrical energy; normally open switch means operably associated with the second end of the locking member and adapted to be closed upon movement of the locking member into said second position; and conductor means connecting in series the switch means, the source of energy and the solenoid for energization of the solenoid upon said movement of the linking member into the second position, said solenoid also being connected to the key alteration means for activating same upon energization of the solenoid in response to movement of the locking member into the second position.

6. An actuation device controllable by an elongated key having a predetermined cross-sectional configuration along at least a portion of its length, said portion being determinative of the control of the device by said key, comprising a housing providing an aperture adapted to accommodate the predetermined configurational portion of the key in predetermined longitudinal alignment, said housing having front and rear portions respectively; a plurality of stop members each having a key contact surface; a plurality of elongated locking members individually secured to the respective stop members and each having first and second opposite ends respectively, said stop members being positionable in selected positions along their corresponding locking members; support means mounting said locking members at the rear of the housing with the respective first ends thereof disposed substantially adjacently of the housing and their respective second ends disposed remotely thereof whereby the contact surfaces of said stop members are disposed at a selected distance from the rear of the housing and facing the aperture in substantially matching relation to the cross-sectional configuration of the key when said key is disposed in said aperture; a key alteration blade mounted at the rear of the housing for reciprocative movement between a first position in spaced relation to the aperture and a second position across said aperture, said blade being adapted to cut through the key when said key is disposed in the aperture and thereby to sever a predetermined length of the configurational portion thereof, said blade having a plurality of holes adapted individually to receive the respective first ends of the locking members, said locking members being adapted to be moved individually between a first position of locking engagement in the respective blade holes with the blade in the first position and a second position removed from said blade; means associated with the support means resiliently urging the locking members and corresponding stop members toward said aperture whereby when said key is pressed against all of said contact surfaces the stop members and locking members resiliently yield to move all of said locking members into the second position; and means operably associated with the blade for propelling it through said key to sever a predetermined section thereof in response to moving the locking members from said holes into said second position, at least one of said propulsion means and blade being adapted to provide an actuation signal in response to movement of the blade into its first position.

7. The device of claim 6 wherein the blade propulsion means comprises a spring mounted on the support means and adapted to assume a position of biased engagement with the blade when the blade is moved into its first position.

8. In combination with a dispensing machine having an activating unit for making a selected item of predetermined value available to a user, the actuation device of claim 6 wherein the selected distance between the contact surfaces and the housing corresponds proportionally to the value of the item and the section of the key to be severed corresponds proportionately to said value; the propulsion means comprises a spring member mounted on the support structure and disposed in biased engagement with the blade, at least one of said spring and blade being adapted to engage said activating unit to actuate the same upon movement of the blade into its first position; and wherein is included means associated with the housing for moving the blade into said first position upon cutting of the key.

9. The combination of claim 8 wherein the key has substantially a tubular shape and the predetermined configurational portion thereof has an elongated inward projection and an elongated outward projection respectively extended longitudinally of the key in predetermined respective locations, said projections each providing an end surface disposed at a predetermined location relative to the cross section of the key; wherein is included an elongated mandrel having respectively front and rear ends; means mounting said mandrel on the locking member support means with its front end disposed substantially concentrically within the aperture and in spaced relation to the housing and its rear end disposed remotely of said housing rearwardly thereof, said mandrel and housing being adapted to accommodate the key therebetween in said aperture, said mandrel having a groove longitudinally thereof adapted to receive the inward projection of the key, said key being disposable on said mandrel for sleeving sliding movement therealong; and wherein the respective stop members are individual to the respective key projections and the respective contact surfaces thereof are disposed in alignment therewith longitudinally of the key for substantially simultaneous engagement with the respective end surfaces thereof upon movement of the key rearwardly of the housing, the contact surface corresponding to the inward projection being disposed in the corresponding mandrel groove; and wherein a second key alteration blade similar to the first key alteration blade is mounted at the rear of the housing substantially symmetrically of the aperture from the first blade for cutting of the key in cooperation with the mandrel and the first blade, there being included in the actuation device elements for moving, locking and propelling the second blade substantially identical to said elements defined for the first blade.

10. The combination of claim 9 wherein the mandrel has a top and bottom surface respectively and a slitter blade is mounted on each of the top and bottom of the front end of the mandrel for slitting the key longitudinally upon sliding the key onto said mandrel, whereby when said blade severs a section of the key said section falls from said mandrel to clear the same for subsequent operation of the device.

11. The combination of claim 9 wherein the mandrel has a top and bottom surface respectively; a pair of elongated shear blades having front and rear ends respectively are mounted with their rear ends disposed at the rear end of the mandrel for pivotal movement about their respective rear ends in opposed relation to the respective top and bottom surfaces of the mandrel, the shear blades are individual to a key alteration blade, and said mandrel provides slots in said top and bottom surfaces respectively for receipt of the respective shear blades; means engaging the shear blades for biasing the same away from the mandrel; and wherein is included means associated with each knife alteration blade for engaging the front end of the corresponding shear blade to propel said shear blade into its corresponding mandrel slot upon propulsion of the key alteration blades, whereby when the key alteration blades sever a section of the key said section is split into separate segments which fall from the mandrel to clear the mandrel for subsequent operation of the device.

References Cited

UNITED STATES PATENTS

| | | | |
|---|---|---|---|
| 2,186,863 | 1/1940 | Gottfried et al. | 194—101 |
| 2,794,869 | 6/1957 | Noregaard | 194—101 |
| 3,015,087 | 12/1961 | O'Gorman | 194—101 |
| 3,064,810 | 11/1962 | Rogier | 194—101 |
| 3,165,691 | 1/1965 | McClanahan | 194—101 |
| 3,204,741 | 9/1965 | Maxwell et al. | 194—101 |

ROBERT B. REEVES, *Primary Examiner.*

STANLEY TOLLBERG, *Examiner.*